United States Patent
Zhang et al.

(10) Patent No.: US 12,297,918 B2
(45) Date of Patent: *May 13, 2025

(54) BIDIRECTIONAL PRESSURE RELIEF VALVE, BATTERY AND ELECTRIC DEVICE

(71) Applicant: CONTEMPORARY AMPEREX TECHNOLOGY (HONG KONG) LIMITED, Hong Kong (CN)

(72) Inventors: Fan Zhang, Ningde (CN); Lei Chen, Ningde (CN); Heyuan Li, Ningde (CN); Langchao Hu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,978

(22) Filed: Apr. 14, 2023

(65) Prior Publication Data

US 2023/0250885 A1 Aug. 10, 2023

Related U.S. Application Data

(63) Continuation of application No. 17/854,687, filed on Jun. 30, 2022, now Pat. No. 11,662,036, which is a (Continued)

(30) Foreign Application Priority Data

Aug. 31, 2020 (CN) .......................... 202010898974.1

(51) Int. Cl.
  *F16K 17/196* (2006.01)
  *H01M 50/204* (2021.01)
  *H01M 50/325* (2021.01)

(52) U.S. Cl.
  CPC ......... *F16K 17/196* (2013.01); *H01M 50/204* (2021.01); *H01M 50/325* (2021.01); *H01M 2200/20* (2013.01)

(58) Field of Classification Search
  None
  See application file for complete search history.

(56) References Cited

U.S. PATENT DOCUMENTS

| 5,282,492 A | 2/1994 | Angeli |
| 11,662,036 B2 * | 5/2023 | Zhang ................ H01M 50/333 |
| | | 429/54 |
| 2003/0111622 A1 * | 6/2003 | Jahn ...................... F16K 31/122 |
| | | 251/63.4 |

FOREIGN PATENT DOCUMENTS

| CN | 201875229 U | 6/2011 |
| CN | 102661411 A | 9/2012 |

(Continued)

OTHER PUBLICATIONS

Machine translation of EP 1106880 A2, published on Jun. 13, 2001 (Year: 2001).*

(Continued)

*Primary Examiner* — Anca Eoff
(74) *Attorney, Agent, or Firm* — XSENSUS LLP

(57) ABSTRACT

Provided in the embodiments of the application are a bidirectional pressure relief valve, a battery and an electric device. The bidirectional pressure relief valve includes a valve seat, a first valve element and a second valve element, where the valve seat has a first end and a second end opposite each other, a channel and a partition plate, the channel penetrating the first end and the second end, a first pressure relief hole being provided on the partition plate, and the partition plate being arranged on an inner wall of the channel, and dividing the channel into a first cavity and a second cavity in an axial direction of the channel. The (Continued)

bidirectional pressure relief valve of the application can be applied to the battery to maintain balance between internal pressure and external pressure of the battery.

16 Claims, 10 Drawing Sheets

Related U.S. Application Data continuation of application No. PCT/CN2021/093427, filed on May 12, 2021.

(56) References Cited

FOREIGN PATENT DOCUMENTS

| CN | 203516869 U | 4/2014 |
|---|---|---|
| CN | 104285506 A | 1/2015 |
| CN | 205609704 U | 9/2016 |
| CN | 206555503 U | 10/2017 |
| CN | 207454852 U | 6/2018 |
| CN | 108626451 A | 10/2018 |
| CN | 108807785 A | 11/2018 |
| CN | 105720221 B | 12/2018 |
| CN | 305082209 S | 3/2019 |
| CN | 110081214 A | 8/2019 |
| CN | 209434271 U | 9/2019 |
| CN | 305435231 S | 11/2019 |
| CN | 210073995 U | 2/2020 |
| CN | 111490212 A | 8/2020 |
| DE | 102012202103 A1 | 8/2013 |
| EP | 1106880 A2 | 6/2001 |
| GB | 426859 A | 4/1935 |
| GB | 1387226 A | 3/1975 |
| JP | S51-135825 U | 11/1976 |
| JP | S52-47334 U | 4/1977 |
| JP | 2007-214537 A | 8/2007 |
| JP | 2014-022218 A | 2/2014 |
| JP | 2017-157542 A | 9/2017 |
| JP | 2019-102193 A | 6/2019 |
| WO | WO8902047 A1 | 3/1989 |
| WO | 2013/146803 A1 | 10/2013 |
| WO | 2020/085212 A1 | 4/2020 |

OTHER PUBLICATIONS

Machine translation of CN104285506, published on Jan. 14, 2015 (Year: 2015).*
Contemporary Amperex Technology Co., Limited, PCT/CN2021/093427, International Search Report and Written Opinion, Jul. 28, 2021, 13 pgs.
Contemporary Amperex Technology Co., Limited, CN202010898974.1, First Office Action, Jul. 8, 2022, 22 pgs.
Contemporary Amperex Technology Co., Limited, CN202010898974.1, Second Office Action, Oct. 20, 2022, 9 pgs.
Zhang et al., U.S. Appl. No. 17/854,687, Non-Final Office Action, Dec. 27, 2022, 8 pgs.
European Search Report issued Jul. 7, 2023 in European Patent Application No. 21859692.2.
Office Action issued Aug. 7, 2023 in Japanese Patent Application No. 2022-541652 with English translation.
Notice of Allowance issued Apr. 1, 2025 in Korean Patent Application No. 10-2022-7023193 with English translation thereof.

* cited by examiner

BIDIRECTIONAL PRESSURE RELIEF VALVE, BATTERY AND ELECTRIC DEVICE

CROSS REFERENCE TO RELATED APPLICATIONS

This application is a continuation application of U.S. patent application Ser. No. 17/854,687, entitled "BIDIRECTIONAL PRESSURE RELIEF VALVE, BATTERY, AND POWERED DEVICE" filed on Jun. 30, 2022, which is a continuation application of PCT Patent Application No. PCT/CN2021/093427, entitled "BIDIRECTIONAL PRESSURE RELIEF VALVE, BATTERY, AND POWERED DEVICE" filed on May 12, 2021, which claims priority to Chinese Patent Application No. 202010898974.1, filed with the State Intellectual Property Office of the People's Republic of China on Aug. 31, 2020, and entitled "BIDIRECTIONAL PRESSURE RELIEF VALVE, BATTERY AND ELECTRIC DEVICE", all of which are incorporated herein by reference in their entirety.

TECHNICAL FIELD

The application relates to the technical field of batteries, and particularly relates to a bidirectional pressure relief valve, a battery and an electric device.

BACKGROUND

The advancement of science and technology broadens use of rechargeable batteries to more extensive fields, such as automobiles or electric bicycles. Batteries are usually sealed so as to improve the reliability of batteries and meet the basic waterproof and dustproof requirements. In the use process of the battery, battery failure caused by battery heating or altitude changes affects the use safety of the battery, resulting in different internal pressure and external pressure of the battery. However, too high or too low air pressure inside the battery is likely to cause structural damage of the sealing surface, resulting in battery failure.

SUMMARY OF THE INVENTION

The application provides a bidirectional pressure relief valve, a battery and an electric device. The bidirectional pressure relief valve may be applied to the battery, thereby maintaining balance between internal pressure and external pressure of the battery.

In one aspect, the application provides a bidirectional pressure relief valve. The bidirectional pressure relief valve includes a valve seat, a first valve element and a second valve element, where the valve seat has a first end and a second end opposite each other, a channel and a partition plate, the channel penetrating the first end and the second end, a first pressure relief hole being provided on the partition plate, and the partition plate being arranged on an inner wall of the channel, and dividing the channel into a first cavity and a second cavity in an axial direction of the channel; at least part of the first valve element is located inside the first cavity and is configured to open or close the first pressure relief hole so as to be in communication with or be isolated from the first cavity and the second cavity; and at least part of the second valve element is located inside the second cavity and is configured to open or close a second pressure relief hole so as to enable or disable connection between the first cavity and the second cavity, wherein the second pressure relief hole is provided on the partition plate or the first valve element.

According to the embodiment of one aspect of the application, the partition plate has a first region and a second region, where the first pressure relief hole is provided in the first region, and the second pressure relief hole is provided in the second region of the partition plate.

According to the embodiment of one aspect of the application, the first region is arranged around the second region; or, the first region is located on one side of the second region in a radial direction of the channel.

According to the embodiment of one aspect of the application, a first through hole is provided on the first valve element and is configured to be in communication with the first cavity and the second pressure relief hole; and/or a second through hole is provided on the second valve element and is configured to be in communication with the second cavity and the first pressure relief hole.

According to the embodiment of one aspect of the application, the second pressure relief hole is provided on the first valve element and corresponds to the first pressure relief hole in position, a protrusion is arranged on the second valve element, at least part of the protrusion is accommodated in the first pressure relief hole and is configured to make contact with or be separated from the first valve element so as to close or open the second pressure relief hole.

According to the embodiment of one aspect of the application, a second through hole is provided on the second valve element and is configured to be in communication with the second cavity and the first pressure relief hole.

According to the embodiment of one aspect of the application, an orthographic projection of the first valve element covers the first pressure relief hole and an orthographic projection of the second valve element covers the second pressure relief hole in the axial direction of the channel.

According to the embodiment of one aspect of the application, the first valve element includes a first elastic member and a first valve body, where the first elastic member abuts against the first valve body, and the first valve body is configured to open or close the first pressure relief hole.

According to the embodiment of one aspect of the application, the first valve body includes a first valve plate and a first sealing gasket, where at least part of the first valve plate is located between the first elastic member and the first sealing gasket, and the first valve body opens or closes the first pressure relief hole by means of the first sealing gasket.

According to the embodiment of one aspect of the application, the surface of the first valve plate away from the first elastic member has a first groove, and at least part of the first sealing gasket is accommodated in the first groove.

According to the embodiment of one aspect of the application, the second valve element includes a second elastic member and a second valve body, where the second elastic member abuts against the second valve body, and the second valve body is configured to open or close the second pressure relief hole.

According to the embodiment of one aspect of the application, the second valve body includes a second valve plate and a second sealing gasket, where at least part of the second valve plate is located between the second elastic member and the second sealing gasket, and the second valve body opens or closes the second pressure relief hole by means of the second sealing gasket.

According to the embodiment of one aspect of the application, the surface of the second valve plate away from the second elastic member has a second groove, and at least part of the second sealing gasket is accommodated in the second groove.

According to the embodiment of one aspect of the application, the bidirectional pressure relief valve further includes an end cover having a through hole, where the end cover is arranged at the first end, the through hole is in communication with the first cavity, and the end cover limits the first valve element in the first cavity; and/or the end cover is arranged at the second end, the through hole is in communication with the second cavity, and the end cover limits the second valve element in the second cavity.

According to the embodiment of one aspect of the application, the bidirectional pressure relief valve further includes a semipermeable membrane and a protective cover, where the semipermeable membrane is located inside the through hole and covers the through hole, the protective cover is connected to the end cover and covers an opening of the through hole, and the protective cover and the semipermeable membrane are arranged at an interval.

The bidirectional pressure relief valve according to the embodiment of the application may be opened in two ways, and is generally in a normally closed state. The first valve element and the second valve element are arranged in the axial direction of the channel of the valve seat, and are used in cooperation with the valve seat to open or close the bidirectional pressure relief valve, such that the valve seat has a compact size and structure in the radial direction of the channel and the axial direction of the channel. The bidirectional pressure relief valve may automatically select to open the first valve element or the second valve element according to a pressure change on two sides so as to balance pressure on the two sides automatically. The radial direction of the channel refers to a direction perpendicular to the axial direction of the channel. After the bidirectional pressure relief valve of the embodiment of the application is applied to the battery, when air pressure inside the battery is too high or too low, the bidirectional pressure relief valve may be opened automatically and is switched from the normally closed state to an opened state so as to balance internal pressure and external pressure of the battery gradually. After the internal pressure and the external pressure of the battery are gradually balanced, the bidirectional pressure relief valve may be automatically closed and stopped and is switched from the opened state to the closed state so as to prevent external gas or water vapor from entering the battery. Thus, when the air pressure inside the battery is too high or too low, a possibility of structural damage of a sealing surface caused by deformation of a case is reduced, thereby reducing a possibility that the external water vapor or dust enters the battery, resulting in battery failure.

In another aspect, the application provides a battery. The battery includes a case, a battery module and a bidirectional pressure relief valve, where the case has an accommodation space; the battery module accommodated inside the accommodation space; and the bidirectional pressure relief valve is arranged in the case, and is configured to balance pressure of the accommodation space so as to maintain the accommodation space at a preset pressure value.

According to the embodiment of another aspect of the application, the battery further includes an annular seal, where the annular seal sleeves a valve seat, and is configured to seal the valve seat and the case.

In another aspect, the application provides an electric device including the battery described in the above embodiments.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

Figure 1:
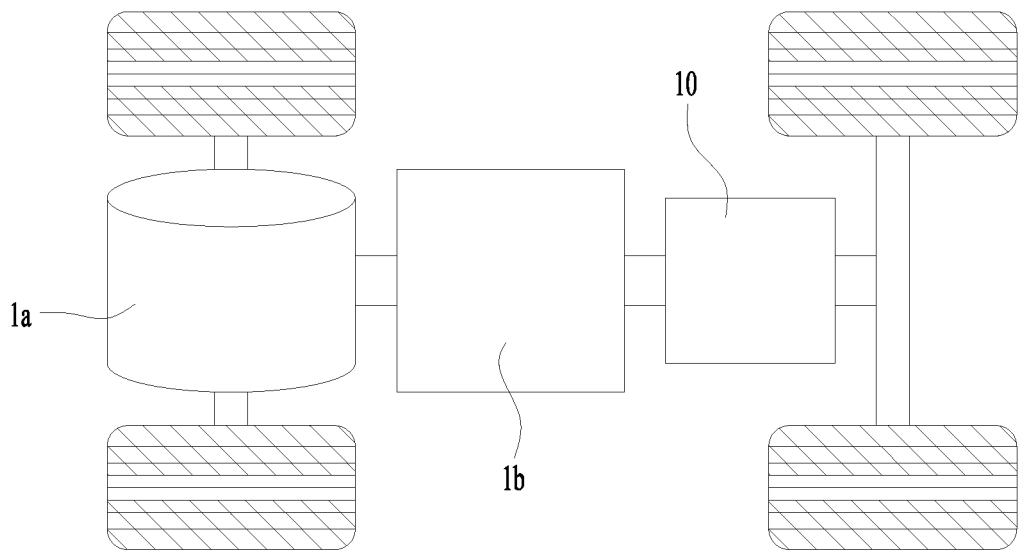
FIG. 1 is a local structural schematic diagram of a vehicle disclosed in one embodiment of the application.

In the drawings, the components are not drawn to actual scale.

BRIEF DESCRIPTION OF THE NUMBERS 1. vehicle; 1*a*. motor; 1*b*. controller;
10. battery; 11. case; 111. upper casing; 112. lower casing; 12. annular seal;
20. bidirectional pressure relief valve;
30. valve seat;
31. first end;
32. second end;
33. channel; 331. first cavity; 332. second cavity;
34. partition plate; 34*a*. first region; 34*b*. second region; 341. first pressure relief hole;
40. first valve element; 40*a*. first through hole; 41. first elastic member; 42. first valve body;
421. first valve plate; 421*a*. first groove; 422. first sealing gasket;
50. second valve element; 50*a*. second through hole; 50*b*. protrusion; 51. second elastic member; 52. second valve body; 521. second valve plate; 521*a*. second groove; 522. second sealing gasket;

60. second pressure relief hole;

70. end cover; 70*a*. through hole;

70'. end cover; 70'*a*. through hole; 70'*b*. accommodation groove;

80. semipermeable membrane;

90. protective cover;

100. gap; and

X. axial direction.

SPECIFIC EMBODIMENTS

The implementation of the application will be further described in detail with reference to the accompanying drawings and the embodiments. The following detailed description of the embodiments and the accompanying drawings serve to illustrate principles of the application as examples, but are not intended to limit the scope of the application, that is, the application is not limited to the described embodiments.

In the description of the application, the following is to be noted: unless otherwise specified, "plurality" means two or more; the terms "upper", "lower", "left", "right", "inner", "outer", etc. indicate azimuthal or positional relations only for ease of description of the application and for simplicity of description, and are not intended to indicate or imply that the referenced device or element must have a particular orientation and be constructed and operative in a particular orientation, and thus may not be construed as a limitation on the application. Moreover, the terms "first", "second", "third", etc. are merely for descriptions and may not be understood as indication or implication of relative importance. "Perpendicular" is not perpendicular in a strict sense, but within error allowance. "Parallel" is not parallel in a strict sense, but within error allowance.

Nouns of locality appearing in the following description are orientation shown in the drawings and are not intended to limit the specific structure of the application. In the description of the application, it is also noted that unless expressly specified otherwise, the terms "mount", "connect", "connected", etc. are to be construed broadly and, for example, may be fixedly connected, or detachably connected, or integrally connected, and may be direct connected or indirect connected via an intermediary medium. The specific meanings of the above terms in the application may be understood on a case-by-case basis for those with ordinary skills in the art.

The applicant, after noticing the problem of failure of an existing battery caused by unstable pressure, researches and analyzes all structures of the battery. The applicant finds that different internal pressure and external pressure of the battery are caused by battery heating or an altitude change in a use process of the battery. However, too high or too low air pressure inside the battery is likely to cause structural damage of a sealing surface, resulting in battery failure caused by external water vapor or dust entering the battery.

Based on the above problems discovered by the applicant, the applicant has made improvements to the structure of the battery. Embodiments of the application are further described below.

For a better understanding of the application, embodiments of the application are described below in conjunction with FIGS. 1-12.

The embodiment of the application provides an electric device using a battery 10 as a power source. The electric device may be, but is not limited to, a vehicle, a ship, an aircraft, etc. With reference to FIG. 1, one embodiment of the application provides a vehicle 1. The vehicle 1 may be a fuel vehicle, a gas vehicle or a new energy vehicle. The new energy vehicle may be a battery electric vehicle, a hybrid electric vehicle, an extended-range vehicle, etc. In one embodiment of the application, the vehicle 1 may include a motor 1*a*, a controller 1*b*, and the battery 10, where the controller 1*b* is used for controlling the battery 10 to supply power to the motor 1*a*; the motor 1*a* is connected to wheels by means of a transmission mechanism, thereby driving the vehicle 1 to travel; and the battery 10 may be used as a driving power source for the vehicle 1 to provide driving power for the vehicle 1 instead of or partially instead of fuel or natural gas. In one example, the battery 10 may be arranged at a bottom or headstock or tailstock of the vehicle 1. The battery 10 may be used to supply power to the vehicle 1. In one example, the battery 10 may be used as an operational power source of the vehicle 1 for a circuit system of the vehicle 1. In some embodiments, the battery 10 may be used for working electric requirements during starting, navigation and operation of the vehicle 1.

Figure 2:
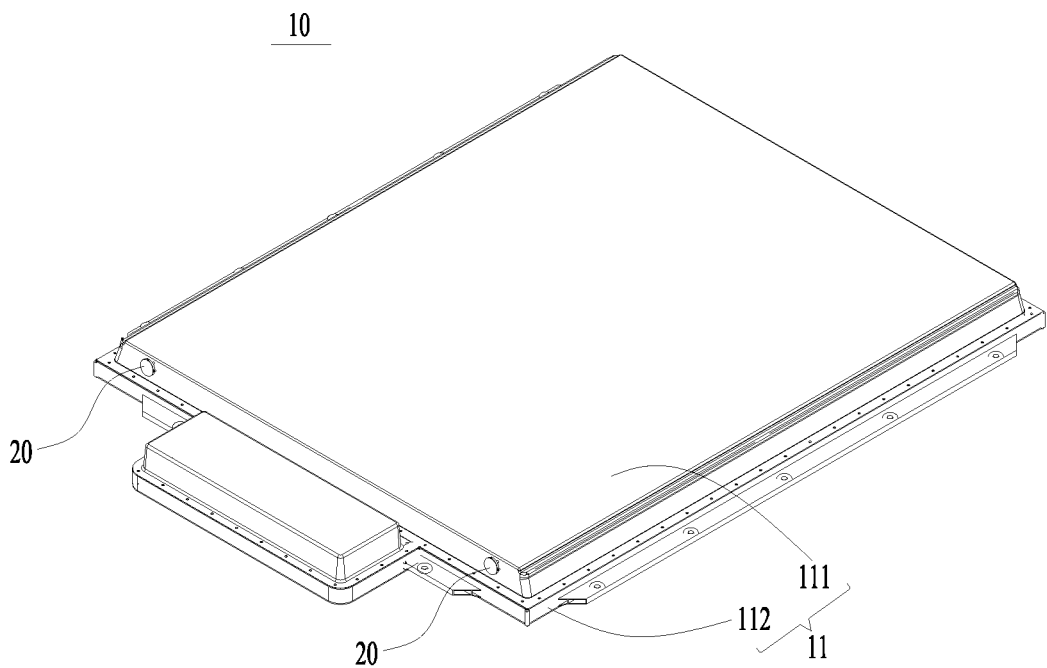
FIG. 2 is a schematic diagram of a battery disclosed in one embodiment of the application.

With reference to FIG. 2, the battery 10 may include two or more battery modules (not shown in FIG. 2). In some embodiments, a battery 10 further includes a case 11. The case 11 has an accommodation space. Two or more battery modules are arranged inside the accommodation space of the case 11. A type of the case 11 is not limited. The case 11 may be a frame-like casing, a disk-like casing, a box-like casing, etc. In some embodiments, the case 11 includes an upper casing 111 and a lower casing 112 covered with the upper casing 111. The upper casing 111 is covered with the lower casing 112 to form the accommodation space for accommodating the battery module. In some other embodiments, a battery 10 includes a case 11 and a plurality of battery cells directly arranged inside the case 11. In some other embodiments, the battery 10 may also include a battery module.

The battery 10 further includes a bidirectional pressure relief valve 20 arranged on the case 11. The number of the bidirectional pressure relief valve 20 may be one or two or above. The bidirectional pressure relief valve 20 is used for balancing pressure of the accommodation space and an external environment so as to maintain the accommodation space at a preset pressure value.

Figure 3:
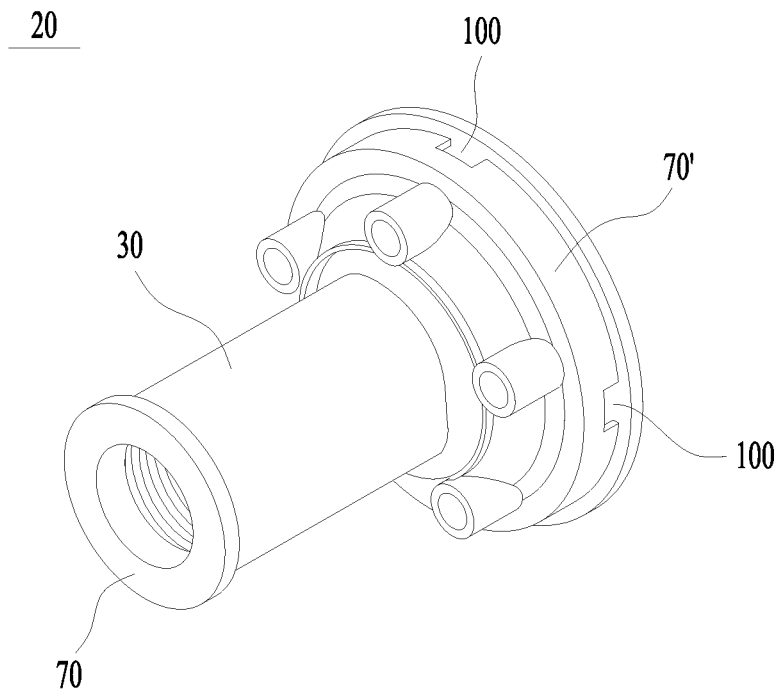
FIG. 3 is a structural schematic diagram of a bidirectional pressure relief valve disclosed in one embodiment of the application.
Figure 4:
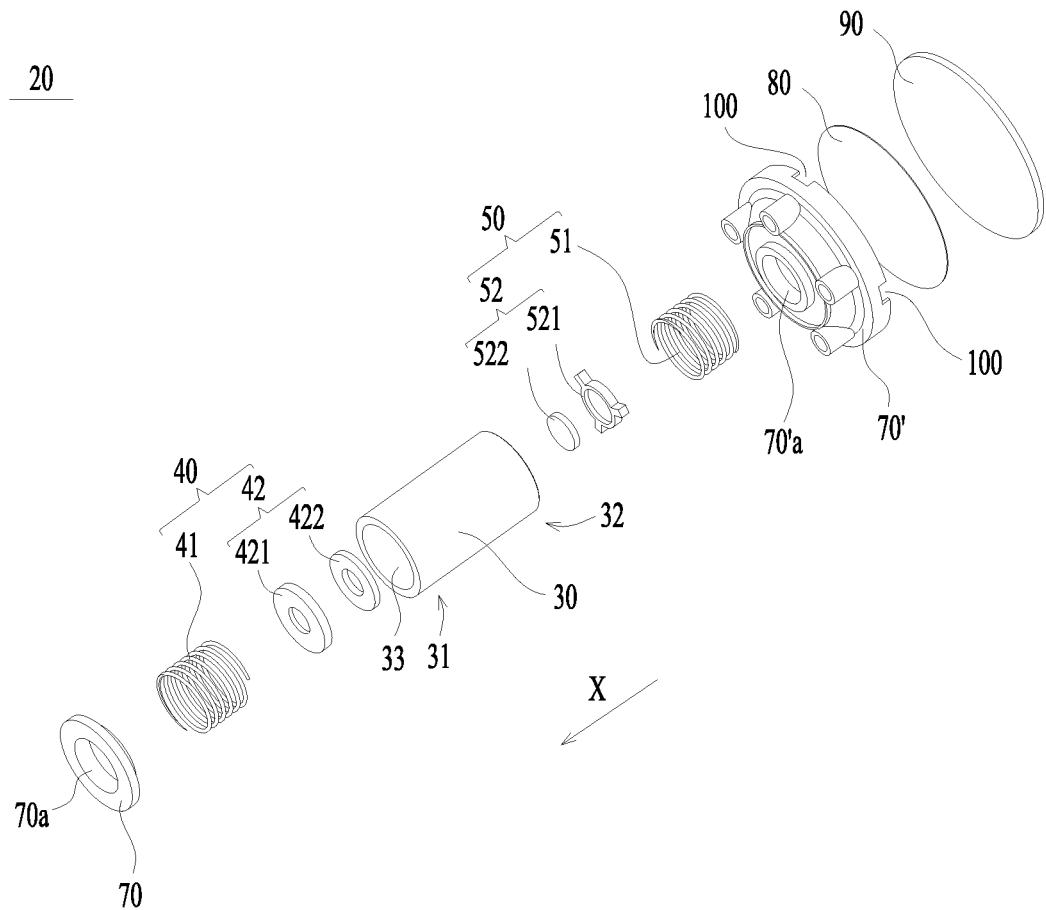
FIG. 4 is a schematic diagram of a breakdown structure of the bidirectional pressure relief valve of the embodiment shown in FIG. 3.

With reference to FIGS. 3 and 4 together, the bidirectional pressure relief valve 20 includes a valve seat 30, a first valve element 40 and a second valve element 50, where the valve seat 30 has a first end 31 and a second end 32 opposite each other and a channel 33 penetrating the first end 31 and the second end 32; and gas may flow in the channel 33 of the valve seat 30 to pass through the valve seat 30. The bidirectional pressure relief valve 20 further includes the first valve element 40 and the second valve element 50, where the first valve element 40 and the second valve element 50 are arranged inside the channel 33.

Figure 5:
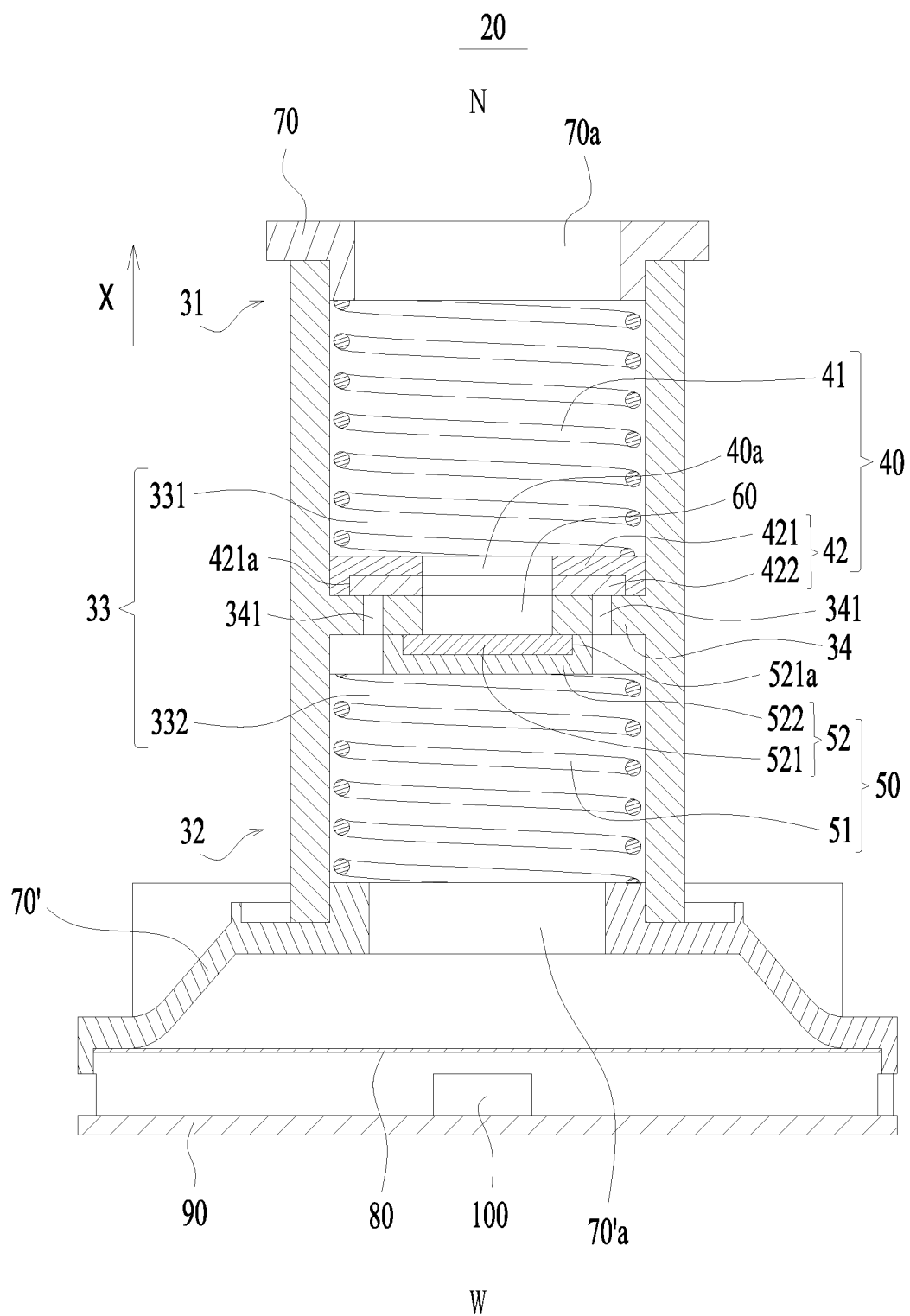
FIG. 5 is a semi-sectional structural schematic diagram of the bidirectional pressure relief valve of the embodiment shown in FIG. 3.

With reference to FIG. 5, the bidirectional pressure relief valve 20 further includes a partition plate 34, where the partition plate 34 is arranged inside the channel 33 of the valve seat 30 and is connected to an inner wall of the channel 33. In an axial direction X of the channel 33, the partition plate 34 divides the channel 33 into a first cavity 331 and a second cavity 332. The first valve element 40 is arranged inside the first cavity 331, and the second valve element 50 is arranged inside the second cavity 332. The partition plate 34 has a first pressure relief hole 341 and a second pressure relief hole 60. The first valve element 40 is configured to open or close the first pressure relief hole 341 to be in communication with or be isolated from the first cavity 331 and the second cavity 332. The second valve element 50 is configured to open or close the second pressure relief hole 60 to be in communication with or be isolated from the first cavity 331 and the second cavity 332. In some embodiments, the valve seat 30 is of a cylindrical structure.

With reference to FIG. 5, when a pressure value on a side W of the bidirectional pressure relief valve 20 is greater than a pressure value on a side N of the bidirectional pressure relief valve, the first valve element 40 is pushed to move away from the partition plate 34, thereby opening the first pressure relief hole 341, and at the moment, the first cavity 331 is in communication with the second cavity 332 by means of the first pressure relief hole 341, such that pressures on the side W and pressure on the side N are gradually balanced. After the pressure on the side W and the pressure on the side N achieve balance, the first valve element 40 moves close to the partition plate 34, thereby closing the first pressure relief hole 341, and at the moment, the first cavity 331 and the second cavity 332 are isolated from each other, and external gas or water vapor may not move from the side W to the side N by means of the bidirectional pressure relief valve 20. In a working process of the first valve element 40, the second valve element 50 maintains sealing contact with the partition plate 34, such that the second valve element 50 is in a state of closing the second pressure relief hole 60. When the pressure value on the side N of the bidirectional pressure relief valve 20 is greater than the pressure value on the side W of the bidirectional pressure relief valve, the second valve element 50 is pushed to move away from the partition plate 34, thereby opening the second pressure relief hole 60, and at the moment, the first cavity 331 is in communication with the second cavity 332 by means of the second pressure relief hole 60, such that the pressure on the side N and the pressure on the side W are gradually balanced. After the pressure on the side W and the pressure on the side N achieve balance, the second valve element 50 moves closer to the partition plate 34, thereby closing the second pressure relief hole 60, and at the moment, the first cavity 331 and the second cavity 332 are isolated from each other. In a working process of the second valve element 50, the first valve element 40 maintains sealing contact with the partition plate 34, such that the first valve element 40 is in a state of closing the first pressure relief hole 341.

The bidirectional pressure relief valve 20 in the embodiment of the application may be opened in two ways and is generally in a normally closed state. The first valve element 40 and the second valve element 50 are arranged in an axial direction X of the channel 33 and are used in cooperation with the valve seat 30 to open or close the bidirectional pressure relief valve 20, such that a size and structure of the valve seat 30 in a radial direction of the channel 33 and in the axial direction X of the channel 33 are compact. The bidirectional pressure relief valve 20 may automatically select to open the first valve element 40 or the second valve element 50 according to a pressure change on two sides, so as to balance pressure on the two sides automatically. The radial direction of the channel 33 refers to a direction perpendicular to the axial direction X of the channel 33. After the bidirectional pressure relief valve 20 of the application is applied to the battery, when air pressure inside the battery is too high or too low, the bidirectional pressure relief valve 20 may be automatically opened and is switched from a normally closed state to an opened state so as to balance internal pressure and external pressure of the battery gradually. After the internal pressure and the external pressure of the battery achieve balance, the bidirectional pressure relief valve 20 is automatically closed and switched from the opened state to the closed state so as to prevent external gas or water vapor from entering the battery. Thus, when the air pressure inside the battery is too high or too low, a possibility that due to deformation of the case 11, a sealing surface is structurally damaged is reduced, thereby reducing a possibility that external water vapor or dust enters the battery, resulting in battery failure.

In some other embodiments, with reference to FIG. 5, in an axial direction X of a channel 33, an orthographic projection of a first valve element 40 at least may cover a first pressure relief hole 341, and an orthographic projection of a second valve element 50 at least may cover a second pressure relief hole 60. When a pressure difference exists on a side W or a N side of a bidirectional pressure relief valve 20, the first valve element 40 or the second valve element 50 may move in the axial direction X so as to open or close the first pressure relief hole 341 or the second pressure relief hole 60. The orthographic projection of the first valve element 40 does not cover the second pressure relief hole 60, thereby reducing a possibility that the first valve element 40 has a bad influence on gas passing ability of the second pressure relief hole 60. The orthographic projection of the second valve element 50 does not cover the first pressure relief hole 341, thereby reducing a possibility that the second valve element 50 has a bad influence on gas passing ability of the first pressure relief hole 341. In some embodiments, the first valve element 40 and the second valve element 50 are arranged in the axial direction X of the channel 33.

In some other embodiments, with reference to FIG. 5, the first valve element 40 includes a first elastic member 41 and a first valve body 42, where the first elastic member 41 abuts against the first valve body 42; the first valve body 42 is configured to open or close the first pressure relief hole 341; the first elastic member 41 is arranged at the side of the first valve body 42 away from a partition plate 34; the first elastic member 41 is limited inside a first cavity 331; and the first elastic member 41 may apply preset pressing stress to the first valve body 42 under an action of an elastic restoring force of the first elastic member so as to press the first valve body 42 on the partition plate 34 so as to maintain good sealing performance between the first valve body 42 and the first pressure relief hole 341. When pressure on the side W is greater than pressure on the side N, gas pressure acts on the first valve body 42 and pushes the first valve body 42 to move away from the partition plate 34. The first valve body 42 may compress the first elastic member 41 and opens the first pressure relief hole 341. When the pressure on the side W and the pressure on the side N achieve balance, the first elastic member 41 drives the first valve body 42 to move close to the partition plate 34 in the axial direction X of the channel 33 under the action of the elastic restoring force of the first elastic member, and finally closes the first pressure relief hole 341. In a radial direction of the channel 33, the first valve body 42 may be limited by an inner wall of the channel 33 so as to improve stability of the first valve body 42 inside the channel 33, reduce a possibility that the first valve body 42 swings in a moving process to impact or scrape the inner wall of the channel 33, and reduce a possibility that the first valve body 42 swings in the moving process to be clamped in a valve seat 30, such that the bidirectional pressure relief valve 20 may not be normally used. In some embodiments, the first valve body 42 makes direct contact with the inner wall of the channel 33. In some embodiments, the first elastic member 41 is a spiral spring. Alternatively, the first elastic member 41 is an elastic sleeve.

In some other embodiments, the first valve body 42 includes a first valve plate 421 and a first sealing gasket 422, where at least part of the first valve plate 421 is located between the first elastic member 41 and the first sealing gasket 422; the first valve body 42 opens or closes the first pressure relief hole 341 by means of the first sealing gasket 422; the first valve plate 421 and the first sealing gasket 422 are arranged in the axial direction X of the channel 33; the first elastic member 41 abuts against the first valve plate 421 and applies pressing stress to the first sealing gasket 422 by means of the first valve plate 421; and a rigidity of the first valve plate 421 is greater than that of the first sealing gasket 422, such that the first valve plate 421 is not prone to deform relative to the first sealing gasket 422, thereby reducing a possibility that the first sealing gasket 422 is prone to jack up, thereby opening the first pressure relief hole 341 accidentally, and improving working stability and reliability of the bidirectional pressure relief valve 20. In addition, the first elastic member 41 does not make direct contact with the first sealing gasket 422, thereby reducing a possibility that when the first elastic member 41 applies the pressing stress to the first sealing gasket 422 for a long time, rebound failure or structural damage of the first sealing gasket 422, and further sealing failure of the first sealing gasket 422 are caused. In some embodiments, the first valve plate 421 is made of plastic, and the first sealing gasket 422 is made of rubber or silicone.

In some other embodiments, with reference to FIG. 5, the surface of the first valve plate 421 away from the first elastic member 41 has a first groove 421a. At least part of the first sealing gasket 422 is accommodated in the first groove 421a. The first valve plate 421 may protect and limit the first sealing gasket 422, thereby reducing a possibility that due to abrasion or position deviation of the first sealing gasket 422, a sealing effect becomes poor or fails.

In some other embodiments, with reference to FIG. 5, the bidirectional pressure relief valve 20 includes an end cover 70, where the end cover 70 has a through hole 70a; and the end cover 70 is arranged on a first end 31. In some embodiments, the first end 31 is detachably connected to the end cover 70. For example, the end cover 70 may be in threaded connection with or bonded to the first end 31. The through hole 70a of the end cover 70 is in communication with the first cavity 331. The end cover 70 limits the first valve element 40 inside the first cavity 331.

In some embodiments, after the first valve body 42 and the first elastic member 41 of the first valve element 40 are sequentially mounted inside the first cavity 331, the end cover 70 is mounted at the first end 31, such that the end cover 70 limits the first elastic member 41 and compresses the first elastic member 41. By adjusting a position of the end cover 70, a compression amount of the first elastic member 41 may be adjusted, thereby adjusting the first valve element 40 to a preset opening pressure value according to requirements.

In some other embodiments, with reference to FIG. 5, the second valve element 50 includes a second elastic member 51 and a second valve body 52, where the second elastic member 51 abuts against the second valve body 52; the second valve body 52 is configured to open or close the second pressure relief hole 60; the second elastic member 51 is arranged at the side of the second valve body 52 away from the partition plate 34; the second elastic member 51 is limited inside a second cavity 332; the second elastic member 51 may apply preset pressing stress to the second valve body 52 under an action of an elastic restoring force of the second elastic member so as to guarantee sealing performance of the second valve body 52 to the second pressure relief hole 60; when the pressure on the side N is greater than the pressure on the side W, gas pressure acts on the second valve body 52 and pushes the second valve body 52 to move away from the partition plate 34; the second valve body 52 may compress the second elastic member 51 and opens the second pressure relief hole 60; and when the pressure on the side N and the pressure on the side W achieve balance, the second elastic member 51 drives the second valve body 52 to move close to the partition plate 34 in the axial direction X of the channel 33 under the action of the elastic restoring force of the second elastic member, and finally closes the second pressure relief hole 60; and in the radial direction of the channel 33, the second valve body 52 may be limited by the inner wall of the channel 33 so as to improve stability of the second valve body 52 inside the channel 33, reduce a possibility that the second valve body 52 swings in a moving process to impact or scrape the inner wall of the channel 33, and reduce a possibility that the second valve body 52 swings in the moving process to be clamped inside the valve seat 30 and may not move, such that the bidirectional pressure relief valve 20 may not be normally used. In some embodiments, the second valve body 52 makes direct contact with the inner wall of the channel 33. In some embodiments, the second elastic member 51 is a spiral spring. Alternatively, the second elastic member 51 is an elastic sleeve.

In some other embodiments, the second valve body 52 includes a second valve plate 521 and a second sealing gasket 522, where at least part of the second valve plate 521 is located between the second elastic member 51 and the second sealing gasket 522; the second valve body 52 opens or closes the second pressure relief hole 60 by means of the second sealing gasket 522; the second valve plate 521 and the second sealing gasket 522 are arranged in the axial direction X of the channel 33; the second elastic member 51 abuts against the second valve plate 521 and applies pressing stress to the second sealing gasket 522 by means of the second valve plate 521; and a rigidity of the second valve plate 521 is greater than that of the second sealing gasket 522, such that the second valve plate 521 is not prone to deform relative to the second sealing gasket 522, thereby reducing a possibility that the second sealing gasket 522 is prone to jack up, thereby opening the second pressure relief hole 60 accidentally, and improving working stability and reliability of the bidirectional pressure relief valve 20. In addition, the second elastic member 51 does not make direct contact with the second sealing gasket 522, thereby reducing a possibility that the second elastic member 51 applies the pressing stress to the second sealing gasket 522 for a long time, resulting in rebound failure or structural damage of the second sealing gasket 522, resulting in sealing failure of the first sealing gasket 422. In some embodiments, the second valve plate 521 is made of plastic, and the second sealing gasket 522 is made of rubber or silicone.

In some other embodiments, with reference to FIG. 5, the surface of the second valve plate 521 away from the second elastic member 51 has a second groove 521a. At least part of the second sealing gasket 522 is accommodated in the second groove 521a. The second valve plate 521 may protect and limit the second sealing gasket 522, thereby reducing a possibility that due to abrasion or position deviation of the second sealing gasket 522, a sealing effect worsens or fails.

In some other embodiments, with reference to FIG. 5, an end cover 70' is arranged on a second end 32. An annotation manner of the end cover 70 and the end cover 70' herein is only for convenience of description, and does not define respective actual structures. In some embodiments, the second end 32 is detachably connected to the end cover 70'. For example, the end cover 70' may be in threaded connection with or bonded to the second end 32. A through hole 70'a of the end cover 70' is in communication with the second cavity 332. The end cover 70' limits the second valve element 50 inside the second cavity 332.

In some embodiments, after the second valve body 52 and the second elastic member 51 of the second valve element 50 are sequentially mounted inside the second cavity 332, the end cover 70' is mounted at the second end 32, such that the end cover 70' limits the second elastic member 51 and compresses the second elastic member 51. By adjusting a position of the end cover 70', a compression amount of the second elastic member 51 may be adjusted, thereby adjusting the second valve element 50 to a preset opening pressure value according to requirements.

In some other embodiments, the end cover 70 or the end cover 70' are arranged on the first end 31 and the second end 32 of the valve seat 30. The bidirectional pressure relief valve 20 may be connected to a case 11 by means of the end cover 70 or the end cover 70'. In some embodiments, the end cover 70 is detachably connected to the case 11 or the end cover 70' is detachably connected to the case 11. For example, the end cover 70 is connected and fixed to the case 11 by means of a screw, or the end cover 70' is connected and fixed to the case 11 by means of the screw.

In some other embodiments, with reference to FIG. 5, the bidirectional pressure relief valve 20 further includes a semipermeable membrane 80 and a protective cover 90, where the semipermeable membrane 80 is located inside the through hole 70' and covers the through hole 70'a of the end cover 70'. The semipermeable membrane 80 may filter dust and liquid water, thereby reducing a possibility that when external water vapor or dust enters a battery, the battery fails. The protective cover 90 is connected to the end cover 70' and covers an opening of the through hole 70'a. In some embodiments, the protective cover 90 is detachably connected to the end cover 70'. For example, the protective cover 90 may be in threaded connection with or bonded to the end cover 70'. The protective cover 90 and the semipermeable membrane 80 are arranged at an interval, thereby forming a cavity therebetween. The protective cover 90 may protect the semipermeable membrane 80, thereby reducing a possibility that when an external object impacts or scratches the semipermeable membrane 80, the semipermeable membrane 80 is damaged. In some embodiments, a gap 100 is provided on the position of the end cover 70' close to the protective cover 90. The cavity between the protective cover 90 and the semipermeable membrane 80 is in communication with an external environment by means of the gap 100, such that gas may enter the cavity by means of the gap 100. Although the end cover 70 and the end cover 70' illustrated in FIG. 5 are different in structure, understandably, in some other embodiments, the end cover 70 and the end cover 70' may be the same in structure.

In some other embodiments, with reference to FIG. 5, a first through hole 40a is provided at a position corresponding to the second pressure relief hole 60 of the first valve element 40. The first through hole 40a is configured to be in communication with the first cavity 331 and the second pressure relief hole 60. In some embodiments, the first through hole 40a has the same diameter as the second pressure relief hole 60. When the first valve element 40 opens the first pressure relief hole 341, gas on the side W may flow to the side N by means of the gap 100 of the end cover 70, the semipermeable membrane 80, the second cavity 332, the first pressure relief hole 341, the first through hole 40a and the first cavity 331. When the second valve element 50 opens the second pressure relief hole 60, gas on the side N may flow through the first cavity 331, the first through hole 40a, the second pressure relief hole 60, the second cavity 332, the semipermeable membrane 80 and the gap 100 of the end cover 70 to the side W.

Figure 6:
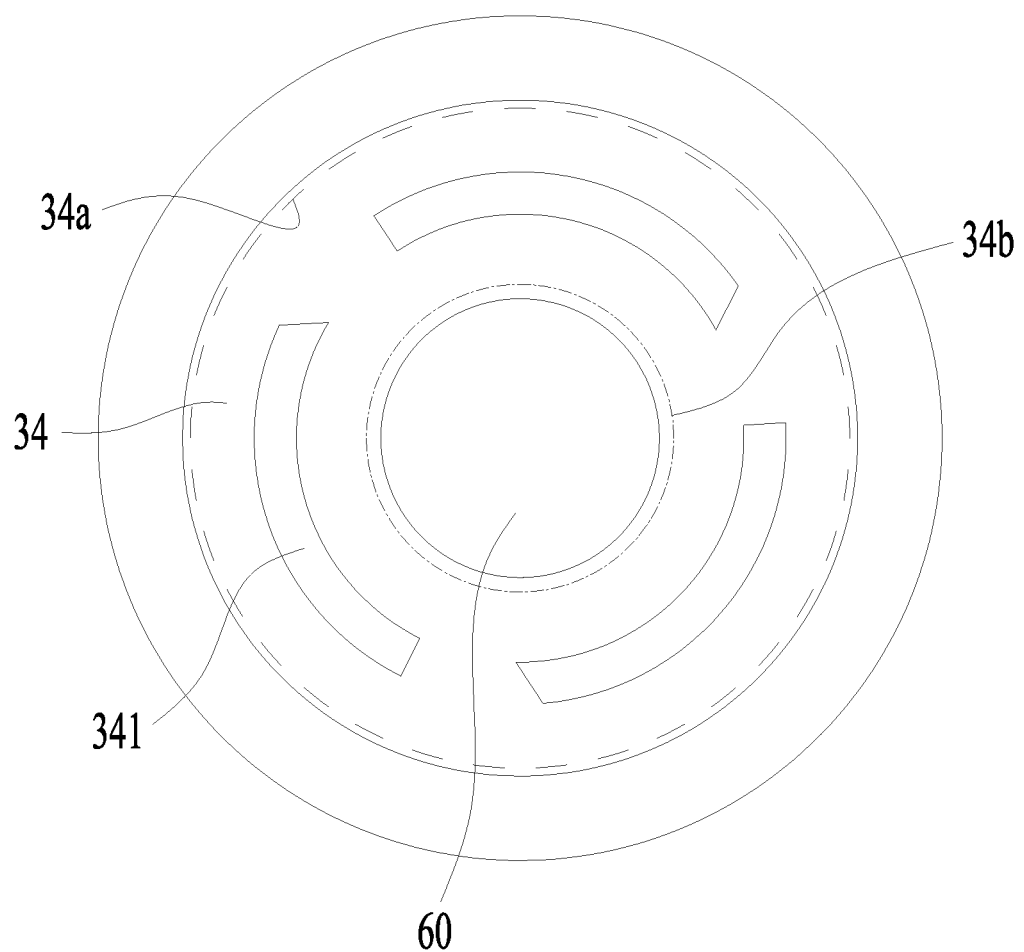
FIG. 6 is a structural schematic diagram of a top view of a valve seat disclosed in one embodiment of the application.

In some other embodiments, with reference to FIG. 6, the partition plate 34 has a first region 34a and a second region 34b. The first pressure relief hole 341 is provided in the first region 34a, and the second pressure relief hole 60 is provided in the second region 34b of the partition plate 34. For convenience of description, a dashed line is used for illustrating the first region 34a and the second region 34b in FIG. 6, but the dashed line does not represent a physical structure or define area sizes of the first region 34a and the second region 34b. In this embodiment, a first region 34a is arranged around the second region 34b.

In some other embodiments, the second pressure relief hole 60 is located at a center region of the partition plate 34. The two or more first pressure relief holes 341 are provided around the second pressure relief hole 60. In some embodiments, the two or more first pressure relief holes 341 are uniformly distributed around the second pressure relief hole 60, thereby guaranteeing overall stress balance of the first valve element 40 favorably, and improving moving stability of the first valve element 40 inside the first cavity 331. In some embodiments, the first pressure relief hole 341 is an arc-shaped hole.

Figure 7:
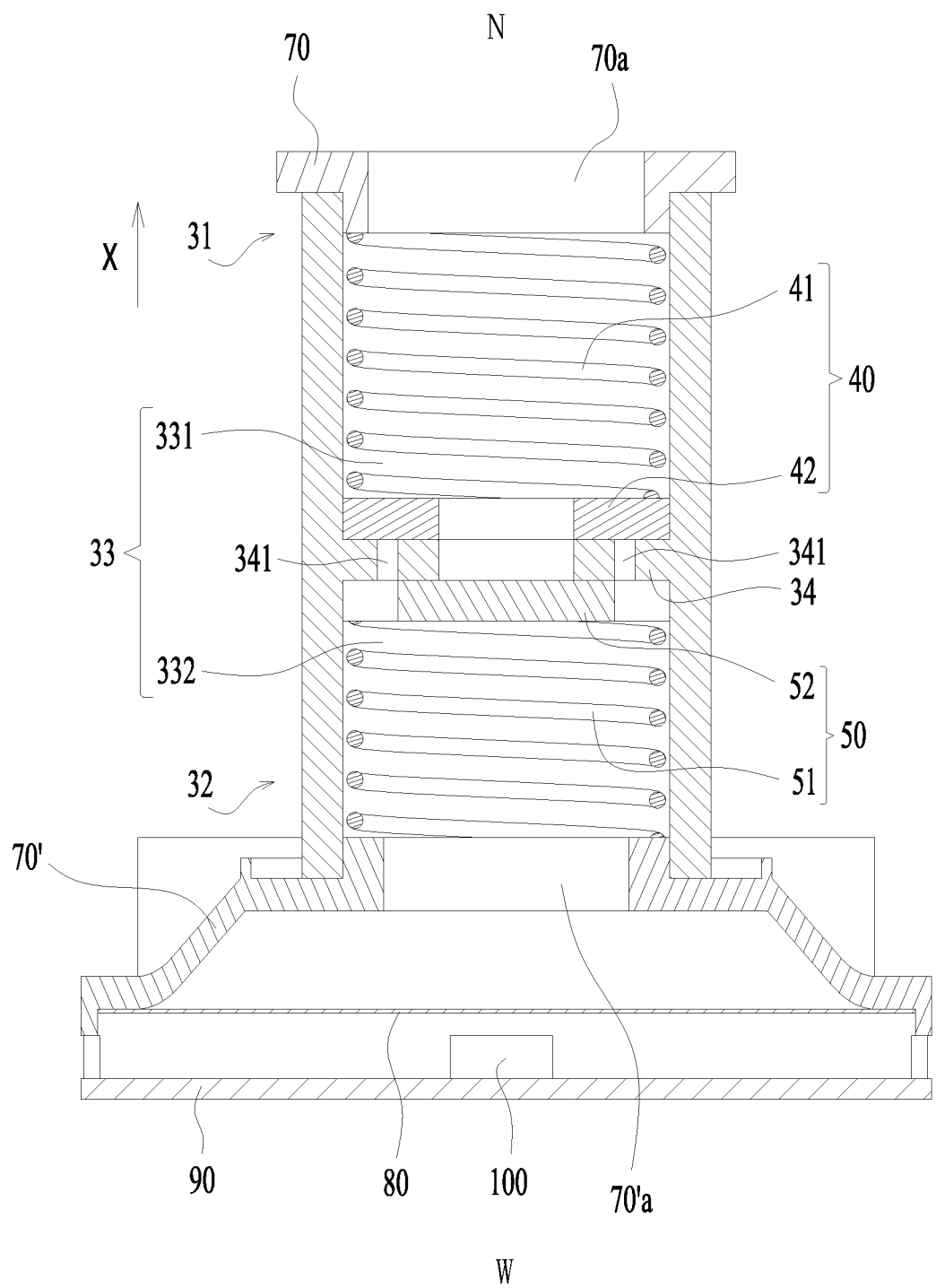
FIG. 7 is a semi-sectional structural schematic diagram of a bidirectional pressure relief valve disclosed in another embodiment of the application.

With reference to FIG. 7, the same parts of this embodiment and any one of some other embodiments are not described herein, and differences are mainly described. A first valve body 42 and a second valve body 52 each are of a structure integrally formed. The first valve body 42 and the second valve body 52 each include a small number of parts, thereby reducing machining and manufacturing difficulty of the first valve body 42 and the second valve body 52 favorably, and improving reliability and assembling simplicity of the first valve body 42 and the second valve body 52 in a using process. In some embodiments, the first valve body 42 and the second valve body 52 may both be made of plastic. Understandably, the first valve body 42 is of a structure integrally formed, and the second valve body 52 includes a second valve plate 521 and a second sealing gasket 522. Alternatively, the second valve body 52 is of a structure integrally formed, and the first valve body 42 includes a first valve plate 421 and a first sealing gasket 422.

Figure 8:
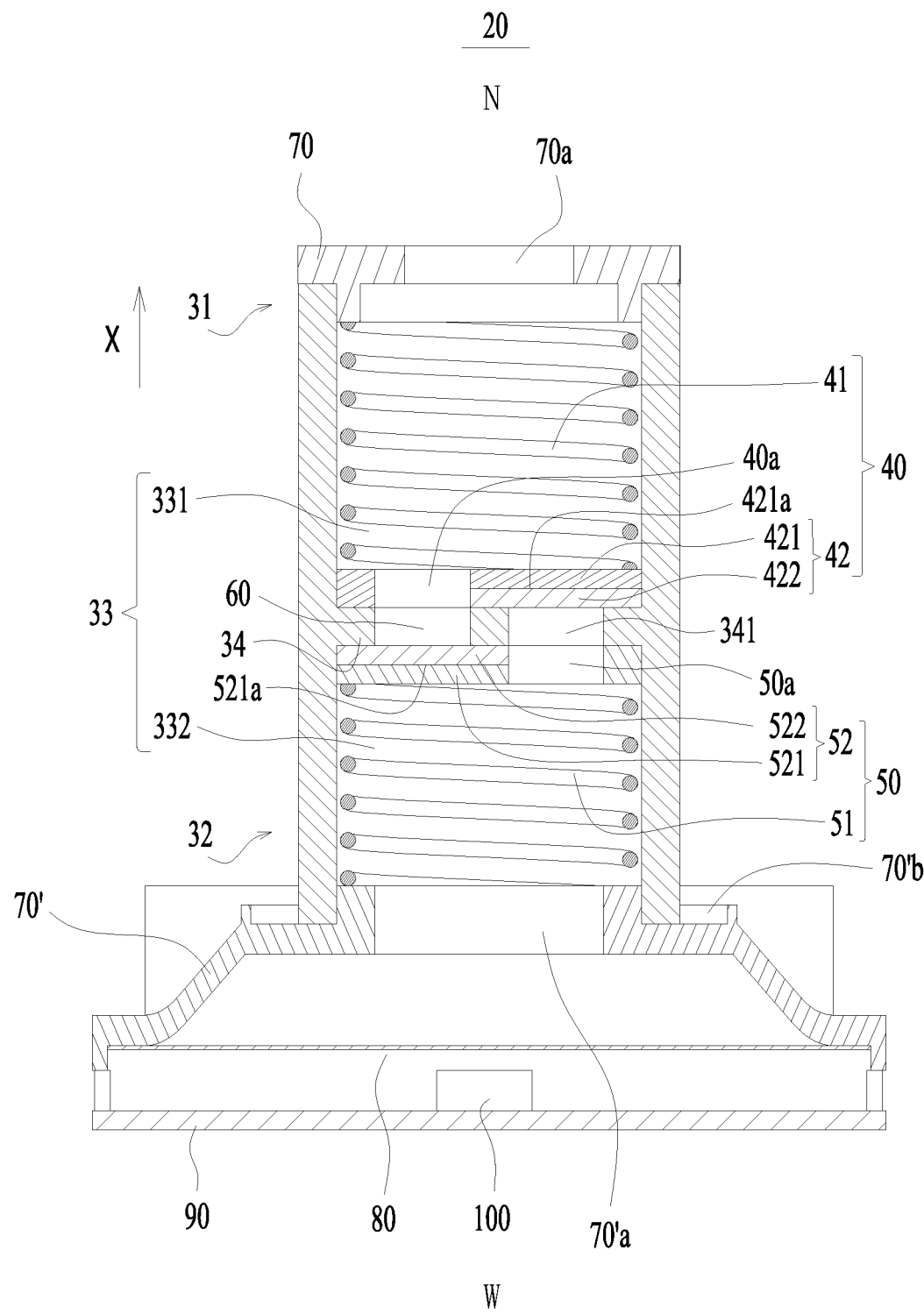
FIG. 8 is a semi-sectional structural schematic diagram of the bidirectional pressure relief valve disclosed in another embodiment of the application.
Figure 9:
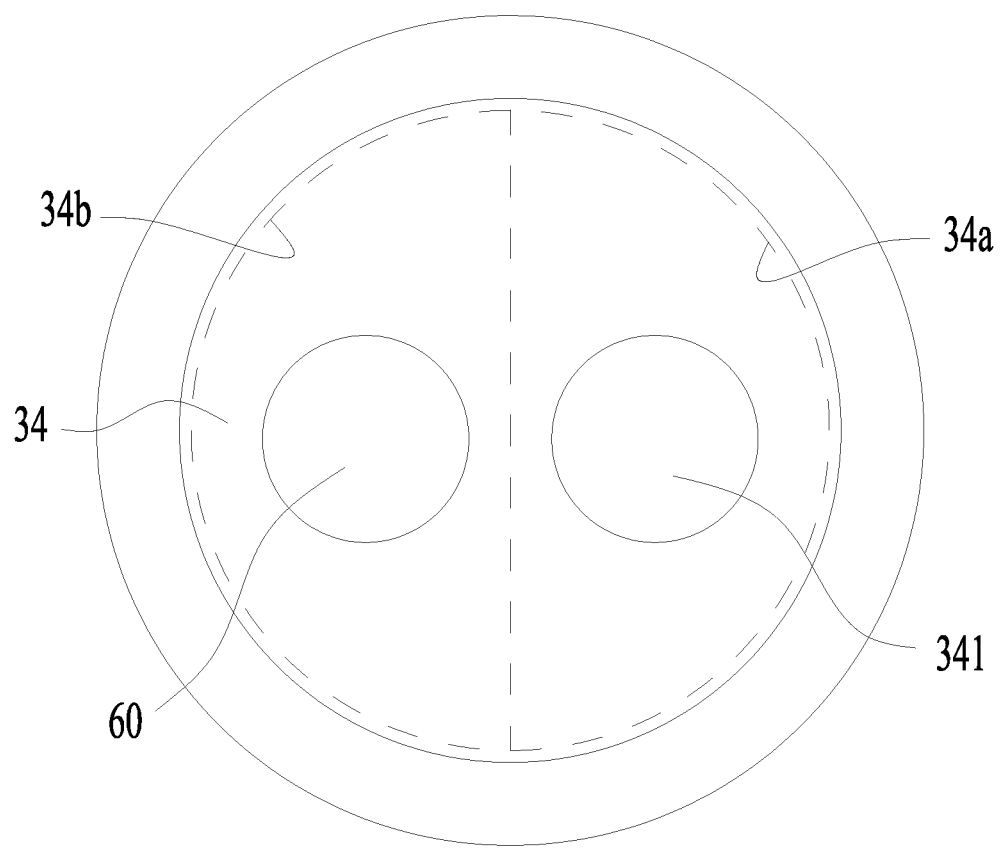
FIG. 9 is a structural schematic diagram of a top view of a valve seat disclosed in another embodiment of the application.

With reference to FIGS. 8 and 9, the same parts of this embodiment and any one of some other embodiments are not described herein, and differences are mainly described. With reference to FIG. 8, the first pressure relief hole 341 and the second pressure relief hole 60 are provided at an interval in the radial direction of the channel 33. A second through hole 50a is provided at a position corresponding to the first pressure relief hole 341 of the second valve element 50. The second through hole 50a is configured to be in communication with the second cavity 332 and the first pressure relief hole 341. In some embodiments, the second through hole 50a has the same diameter as the first pressure relief hole 341. When the first valve element 40 opens the first pressure relief hole 341, gas on the side W may flow to the side N by means of a gap 100 of an end cover 70, a semipermeable membrane 80, the second cavity 332, the second through hole 50a, the first pressure relief hole 341, a first through hole 40a and the first cavity 331. When the second valve element 50 opens the second pressure relief hole 60, gas on the side N may flow through the first cavity 331, the first through hole 40a, the second pressure relief hole 60, the second cavity 332, the second through hole 50a, the semipermeable membrane 80 and the gap 100 of the end cover 70 to the side W. For convenience of description, a dashed line is used for illustrating the first region 34a and the second region 34b in FIG. 9, but the dashed line does not represent a physical structure or also does not define area sizes of the first region 34a and the second region 34b. In this embodiment, in the radial direction of the channel 33, the first region 34a is located at one side of the second region 34b. One, two or more first pressure relief holes 341 may be provided in the first region 34a. One, two or more second pressure relief holes 60 may be provided in the second region 34b.

Figure 10:
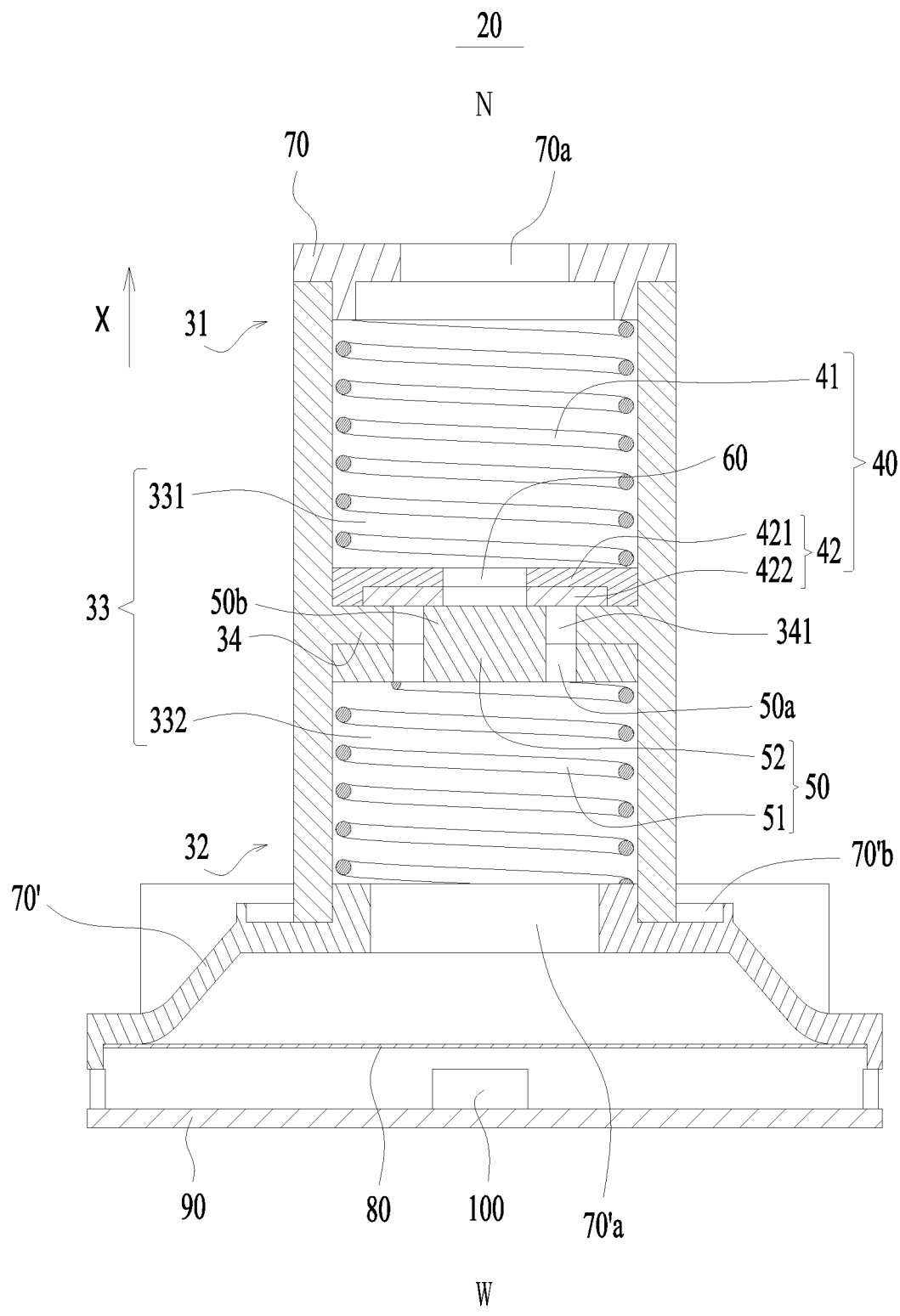
FIG. 10 is a semi-sectional structural schematic diagram of a bidirectional pressure relief valve disclosed in yet another embodiment of the application.
Figure 11:
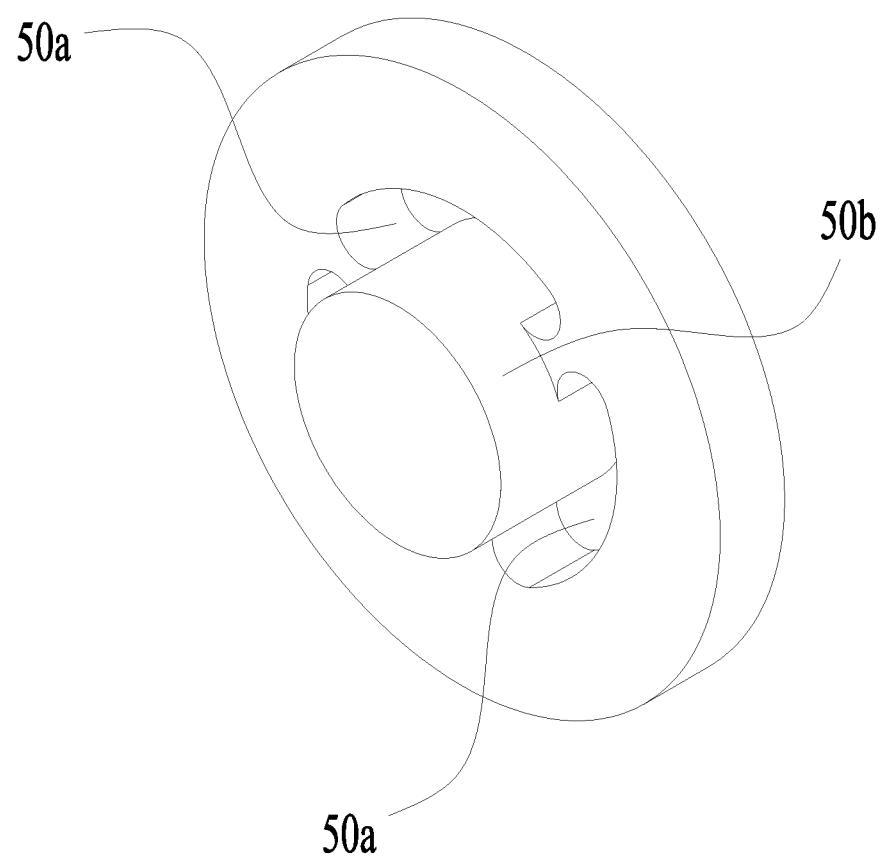
FIG. 11 is a structural schematic diagram of a second valve element disclosed in one embodiment of the application.

With reference to FIG. 10, the same parts of this embodiment and any one of some other embodiments are not described herein, and differences are mainly described. The first pressure relief hole 341 is provided on the partition plate 34. The second pressure relief hole 60 is provided on the first valve element 40. In the axial direction X of the channel 33, the first pressure relief hole 341 corresponds to the second pressure relief hole 60 in position. With reference to FIG. 11, a protrusion 50a is arranged on the second valve element 50. At least part of the protrusion 50a is accommodated in the first pressure relief hole 341 and is configured to make contact with or be separated from the first valve element 40 so as to close or open the second pressure relief hole 60 on the first valve element 40. In some other embodiments, the second valve element 50 includes the second elastic member 51 and the second valve body 52. A protrusion 50a is arranged on the second valve body 52. A second through hole 50a is provided at a position corresponding to the first pressure relief hole 341 of the second valve element 50. The second through hole 50a is configured to be in communication with the second cavity 332 and the first pressure relief hole 341.

When the pressure value on the side W of the bidirectional pressure relief valve 20 is greater than the pressure value on the side N of the bidirectional pressure relief valve, the first valve element 40 is pushed to move away from the partition plate 34, such that the first valve element 40 and the second valve element 50 are disconnected so as to open the first pressure relief hole 341, and at the moment, the first cavity 331 is in communication with the second cavity 332 by means of the first pressure relief hole 341 and the second pressure relief hole 60, such that the pressure on the side W and the pressure on the side N are gradually balanced. When the first valve element 40 opens the first pressure relief hole 341, the gas on the side W may flow to the side N by means of the gap 100 of the end cover 70, the semipermeable membrane 80, the second cavity 332, the second through hole 50a, the first pressure relief hole 341, the second pressure relief hole 60 and the first cavity 331. When the pressure value on the side W of the bidirectional pressure relief valve 20 is greater than the pressure value on the side N of the bidirectional pressure relief valve, the second valve element 50 is pushed to move away from the partition plate 34, such that the first valve element 40 and the second valve element 50 are disconnected so as to open the second pressure relief hole 60, and at the moment, the first cavity 331 is in communication with the second cavity 332 by means of the first pressure relief hole 341 and the second pressure relief hole 60, such that the pressures on the side W and the pressure on the side N are gradually balanced. When the second valve element 50 opens the second pressure relief hole 60, the gas on the side N may flow through the first cavity 331, the second pressure relief hole 60, the first pressure relief hole 341, the second cavity 332, the second through hole 50a, the semipermeable membrane 80 and the gap 100 of the end cover 70 to the side W.

In some other embodiments, the first valve body 42 includes the first valve plate 421 and the first sealing gasket 422, where the second valve element 50 is of a structure integrally formed.

Figure 12:
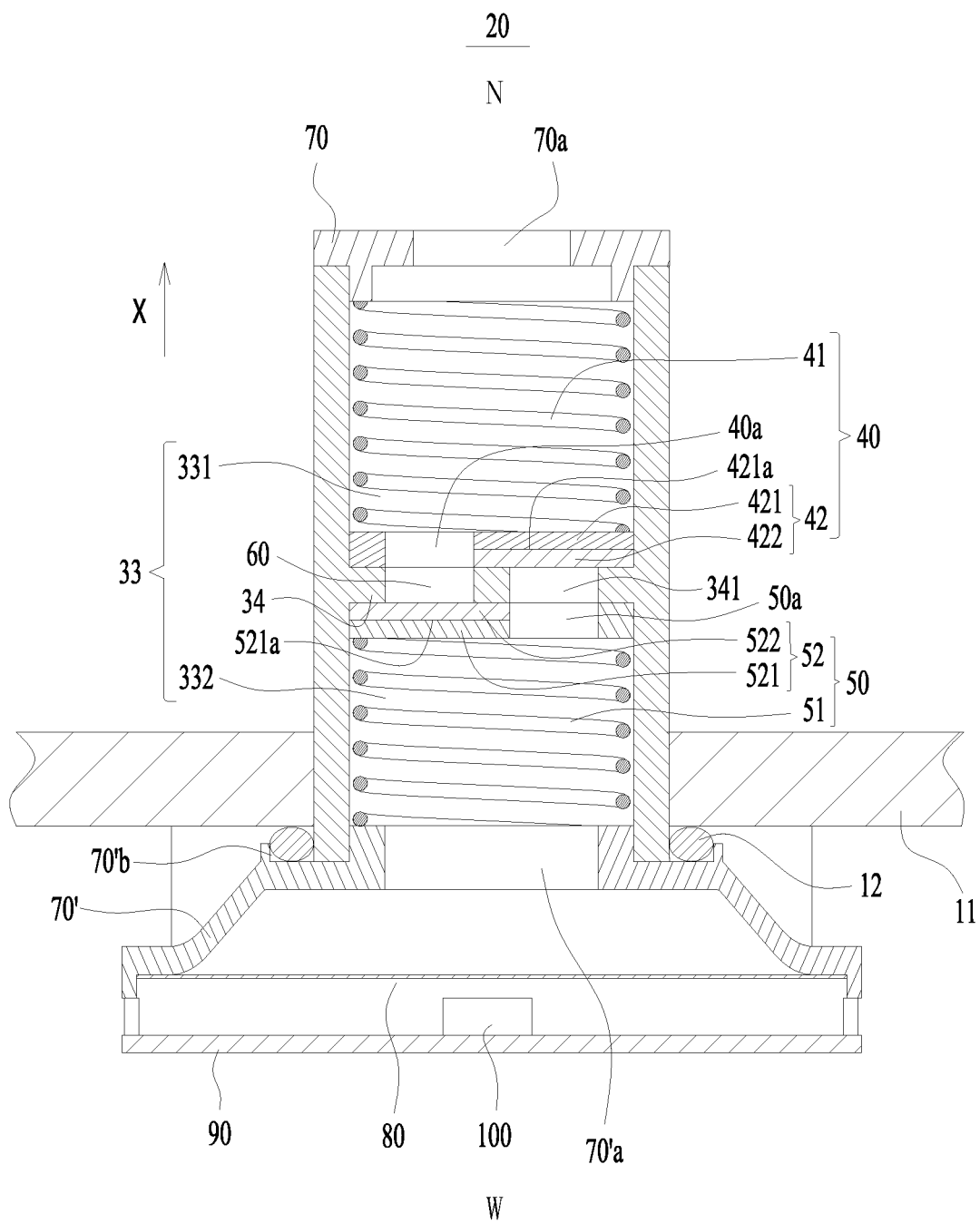
FIG. 12 is a sectional structural schematic diagram of a connection state between the bidirectional pressure relief valve and a case disclosed in one embodiment of the application.

In some other embodiments, with reference to FIG. 12, the bidirectional pressure relief valve 20 is connected to the case 11 of the battery. In some embodiments, the bidirectional pressure relief valve 20 is detachably connected to the case 11. For example, the valve seat 30 is in threaded connection with or boned to the case 11. The battery further includes an annular seal, where the annular seal sleeves the valve seat 30; and the annular seal is configured to seal the valve seat 30 and the case 11, thereby reducing a possibility that external dust or water vapor enters the battery by means of the gap between the valve seat 30 and the case 11, and reducing a possibility that when an interior of the battery is in communication with the external environment due to sealing failure between the valve seat 30 and the case 11, failure of the bidirectional pressure relief valve 20 is caused. In some embodiments, the annular seal 12 may be made of rubber or silicone.

In some other embodiments, the end cover 70' of the bidirectional pressure relief valve 20 has an accommodation groove 70'b. Part of the annular seal is arranged inside the accommodation groove 70'b. The end cover 70' and the case 11 jointly press the annular seal. The end cover 70' limits the annular seal, thereby reducing a possibility of sealing failure of the annular seal caused by position deviation.

The bidirectional pressure relief valve 20 of the embodiment of the application may be opened in two ways by means of the first valve element 40 and the second valve element 50 arranged in the axial direction X of the channel 33 of the valve seat 30. A manner of arranging the first valve element 40 and the second valve element 50 in the axial direction X makes a structure of the bidirectional pressure relief valve 20 compact. After the bidirectional pressure relief valve 20 of the embodiment of the application is applied to the battery, the interior of the battery and external pressure may maintain balanced by means of the bidirectional pressure relief valve 20, thereby reducing a possibility of sealing failure caused by structural damage of the case 11 of the battery on the sealing surface, thereby reducing a possibility that when external water vapor or dust enters the battery by means of the damaged sealing surface, battery failure is caused, and improving reliability and stability of the battery in a using process.

While the application has been described with reference to optimal embodiments, various modifications may be made thereto and equivalents may be substituted for components thereof without departing from the scope of the application. In particular, the various technical features mentioned in the various embodiments may be combined in any way as long as no structural conflict exists. The application is not limited to the particular embodiments disclosed herein, but includes all technical solutions falling within the scope of the claims.

What is claimed is:

1. A bidirectional pressure relief valve, comprising:
a valve seat having a first end and a second end opposite each other, a channel and a partition plate, the channel penetrating the first end and the second end, a first pressure relief hole being provided on the partition plate, and the partition plate being arranged on an inner wall of the channel, and dividing the channel into a first cavity and a second cavity in an axial direction of the channel;
a first valve structure, at least part of the first valve structure being located inside the first cavity and being configured to open or close the first pressure relief hole so as to cause the first cavity to be in communication with or be isolated from the second cavity; and
a second valve structure, at least part of the second valve structure being located inside the second cavity and being configured to open or close a second pressure relief hole so as to cause the first cavity to be in communication with or be isolated from the second cavity,
wherein the first valve structure comprises a first elastic structure and a first valve body, the first elastic structure abutting against the first valve body, the first valve body comprises a first valve plate and a first sealing gasket, at least part of the first valve plate being located between the first elastic structure and the first sealing gasket, and the first valve body being configured to open or close the first pressure relief hole by means of the first sealing gasket,
a rigidity of the first valve plate is greater than that of the first sealing gasket, and
a surface of the first valve plate away from the first elastic structure has a first groove, at least part of the first sealing gasket being accommodated in the first groove.

2. The bidirectional pressure relief valve according to claim 1, wherein the partition plate has a first region and a second region, the first pressure relief hole being provided in the first region, and the second pressure relief hole being provided in the second region of the partition plate.

3. The bidirectional pressure relief valve according to claim 2, wherein the first region is arranged around the second region; or, the first region is located on one side of the second region in a radial direction of the channel.

4. The bidirectional pressure relief valve according to claim 3, wherein a first through hole is provided on the first valve structure and is configured to be in communication with the first cavity and the second pressure relief hole; and/or a second through hole is provided on the second valve structure and is configured to be in communication with the second cavity and the first pressure relief hole.

5. The bidirectional pressure relief valve according to claim 1, wherein the second pressure relief hole is provided on the first valve structure and corresponds to the first pressure relief hole in position, a protrusion is arranged on the second valve structure, at least part of the protrusion is accommodated in the first pressure relief hole and is configured to make contact with or be separated from the first valve structure so as to close or open the second pressure relief hole.

6. The bidirectional pressure relief valve according to claim 5, wherein a second through hole is provided on the second valve structure and is configured to be in communication with the second cavity and the first pressure relief hole.

7. The bidirectional pressure relief valve according to claim 6, wherein an orthographic projection of the first valve structure covers the first pressure relief hole and an orthographic projection of the second valve structure covers the second pressure relief hole in the axial direction of the channel.

8. The bidirectional pressure relief valve according to claim 1, wherein the second valve structure comprises a second elastic structure and a second valve body, the second elastic structure abutting against the second valve body, and the second valve body being configured to open or close the second pressure relief hole.

9. The bidirectional pressure relief valve according to claim 8, wherein the second valve body comprises a second valve plate and a second sealing gasket, at least part of the second valve plate being located between the second elastic structure and the second sealing gasket, and the second valve body opening or closing the second pressure relief hole by means of the second sealing gasket.

10. The bidirectional pressure relief valve according to claim 9, wherein the surface of the second valve plate away from the second elastic structure has a second groove, at least part of the second sealing gasket being accommodated in the second groove.

11. The bidirectional pressure relief valve according to claim 10, further comprising an end cover having a through hole, wherein the end cover is arranged at the first end, the through hole is in communication with the first cavity, and the end cover limits the first valve structure in the first cavity; and/or the end cover is arranged at the second end, the through hole is in communication with the second cavity, and the end cover limits the second valve structure in the second cavity.

12. The bidirectional pressure relief valve according to claim 11, further comprising a semipermeable membrane and a protective cover, wherein the semipermeable membrane is located inside the through hole and covers the through hole, the protective cover is connected to the end cover and covers an opening of the through hole, and the protective cover and the semipermeable membrane are arranged at an interval.

13. A battery, comprising:
a case having an accommodation space;
a battery module accommodated inside the accommodation space; and
the bidirectional pressure relief valve according to claim 12, the bidirectional pressure relief valve being arranged in the case, and being configured to balance pressure of the accommodation space so as to maintain the accommodation space at a preset pressure value.

14. The battery according to claim 13, further comprising an annular seal, wherein the annular seal sleeves the valve seat, and is configured to seal the valve seat and the case.

15. An electric device, comprising a battery according to claim 13.

16. The bidirectional pressure relief valve according to claim 1, wherein an orthographic projection of the first valve plate completely covers the first sealing gasket in the axial direction of the channel.

* * * * *